(12) United States Patent
Longueville et al.

(10) Patent No.: US 9,227,556 B2
(45) Date of Patent: Jan. 5, 2016

(54) LIGHTING CONTROL SYSTEM AND METHOD FOR A MOTOR VEHICLE

(75) Inventors: François Longueville, Saint Genis-Laval (FR); Philippe Crave, Lyons (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 14/420,671

(22) PCT Filed: Aug. 22, 2012

(86) PCT No.: PCT/IB2012/002132
§ 371 (c)(1),
(2), (4) Date: Feb. 10, 2015

(87) PCT Pub. No.: WO2014/030028
PCT Pub. Date: Feb. 27, 2014

(65) Prior Publication Data
US 2015/0217678 A1  Aug. 6, 2015

(51) Int. Cl.
*B60Q 1/02* (2006.01)
*B60Q 1/14* (2006.01)
*B60Q 1/00* (2006.01)
*H05B 37/02* (2006.01)

(52) U.S. Cl.
CPC ............ *B60Q 1/143* (2013.01); *B60Q 1/0076* (2013.01); *B60Q 1/1461* (2013.01); *H05B 37/0218* (2013.01); *H05B 37/0227* (2013.01); *B60Q 2300/21* (2013.01)

(58) Field of Classification Search
None
See application file for complete search history.

(56) References Cited

U.S. PATENT DOCUMENTS

| 5,382,877 A | 1/1995 | Katsumata et al. |
| 5,773,935 A | 6/1998 | Wagner et al. |
| 7,898,182 B2 * | 3/2011 | Futamura .................. 315/80 |
| 2008/0246404 A1 * | 10/2008 | Shelton et al. ............ 315/82 |

FOREIGN PATENT DOCUMENTS

WO   2010076589 A1   7/2010

OTHER PUBLICATIONS

International Search Report (Apr. 22, 2013) for corresponding International Application PCT/IB2012/002132

* cited by examiner

*Primary Examiner* — Anh Tran
(74) *Attorney, Agent, or Firm* — WRB-IP LLP

(57) ABSTRACT

A lighting control system and a lighting control method to implement, in an automotive vehicle, external running lights in different available lighting configurations are provided. The lighting control method includes detecting at least one environment parameter, selecting among the different available lighting configurations and depending on the parameter, which lighting configurations can be implemented, depending on the parameter, defining in which order the selected lighting configurations are implemented when an input device is manually actuated, detecting a manual actuation on the input device, depending on a motion of the input device or a motion on the input device, implementing at least one lighting configuration that is chosen among the selected lighting configurations according to the implementation order.

21 Claims, 7 Drawing Sheets

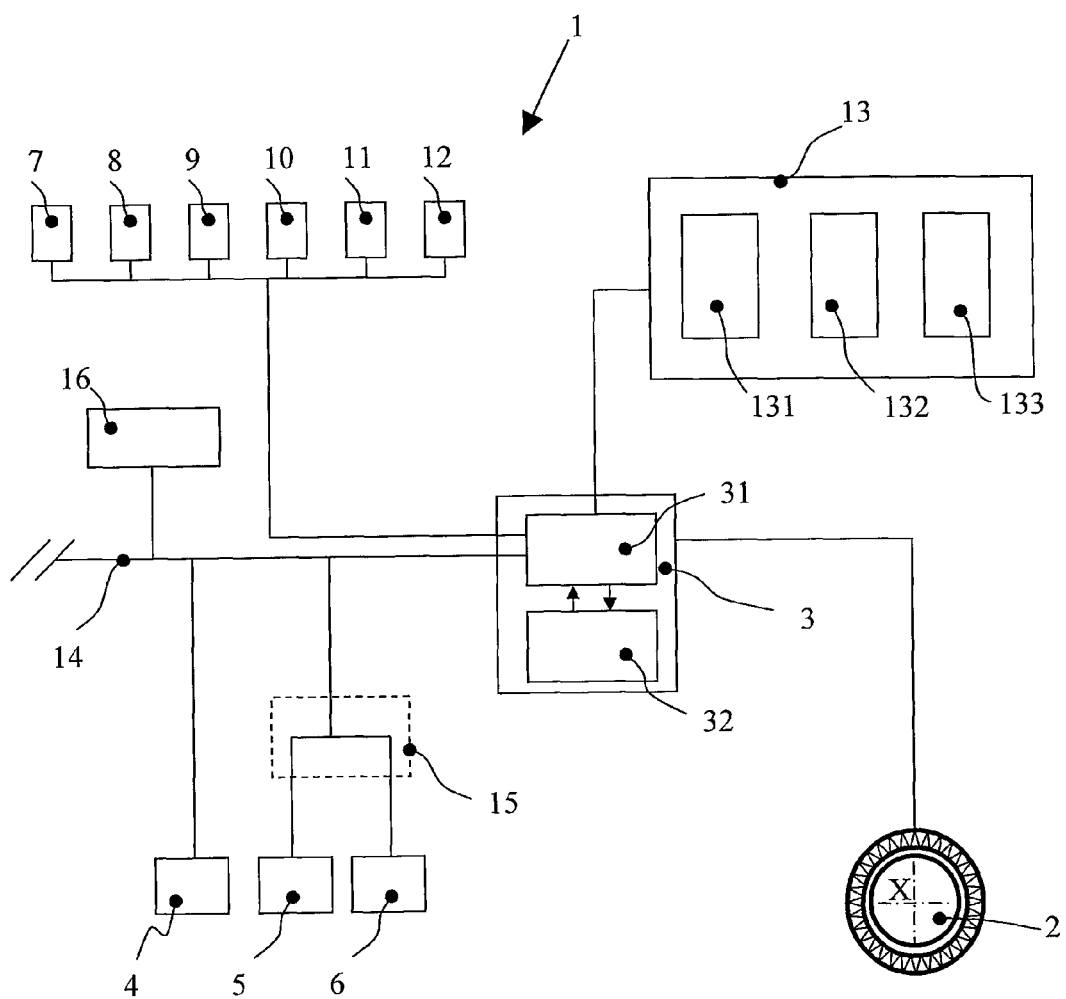
Fig°1

Fig°2-a
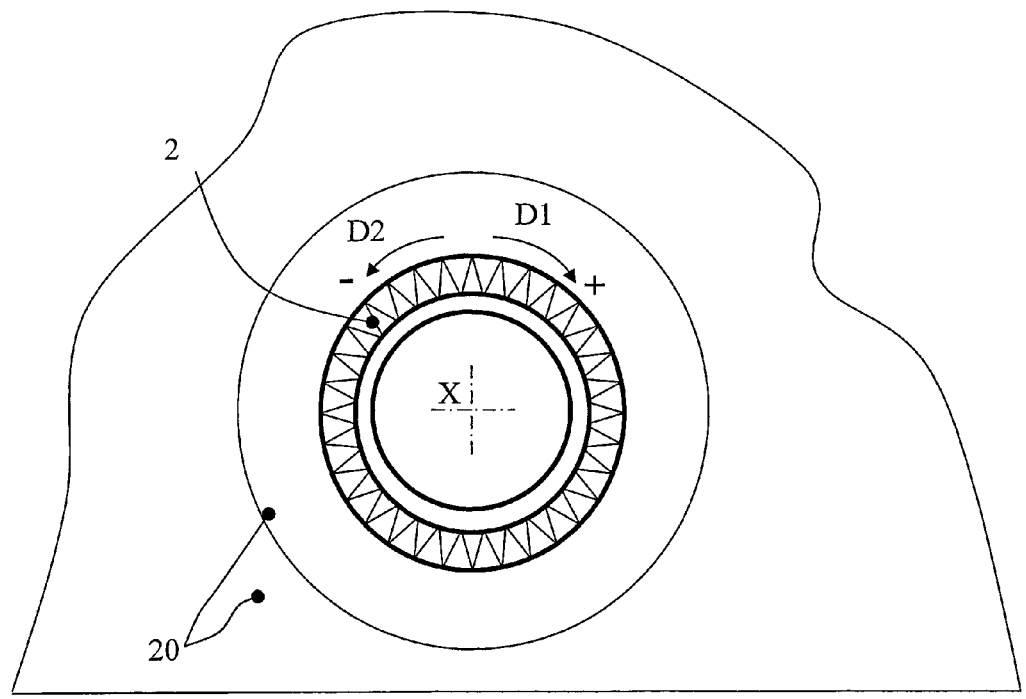
Fig°2-b
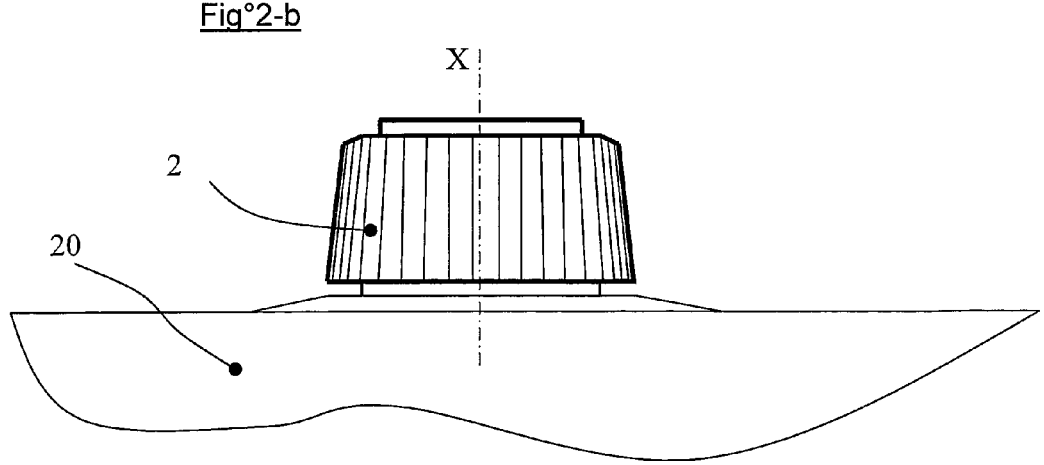

Fig°3 - a
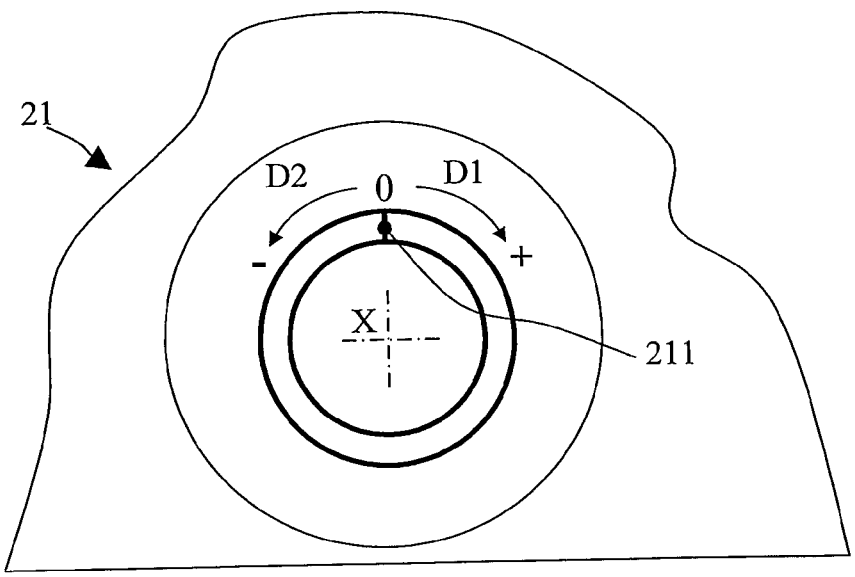
Fig°3 - b
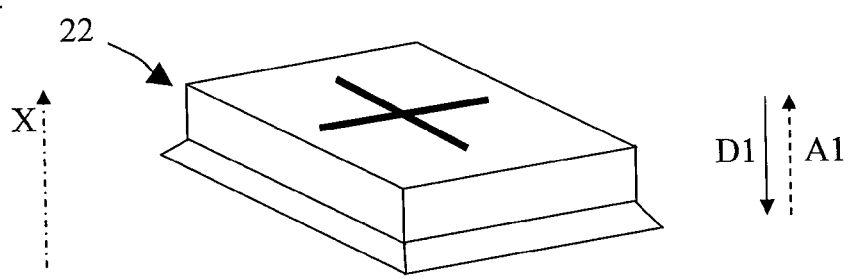
Fig°3 - c
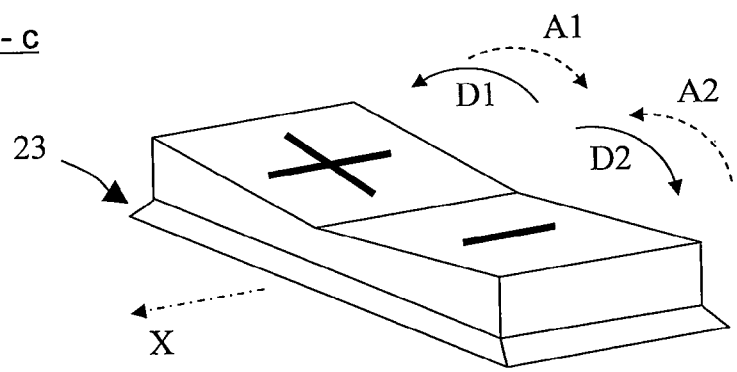

Fig°3 - d
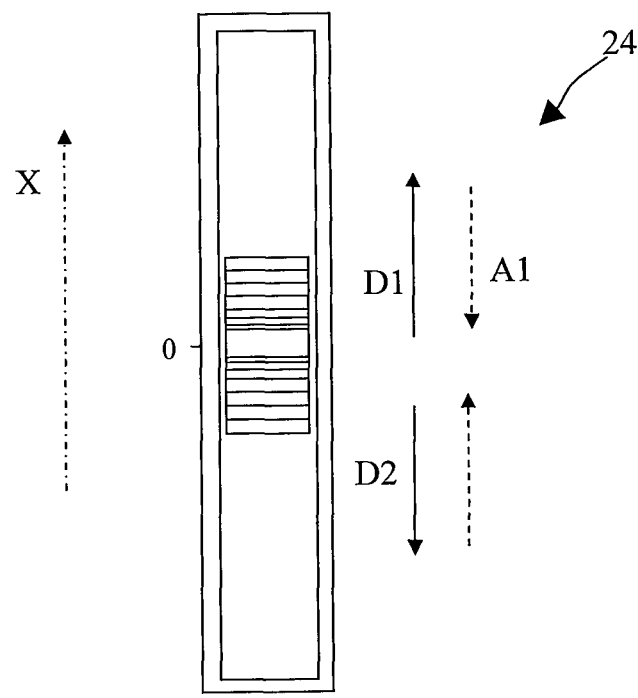
Fig°3 - e
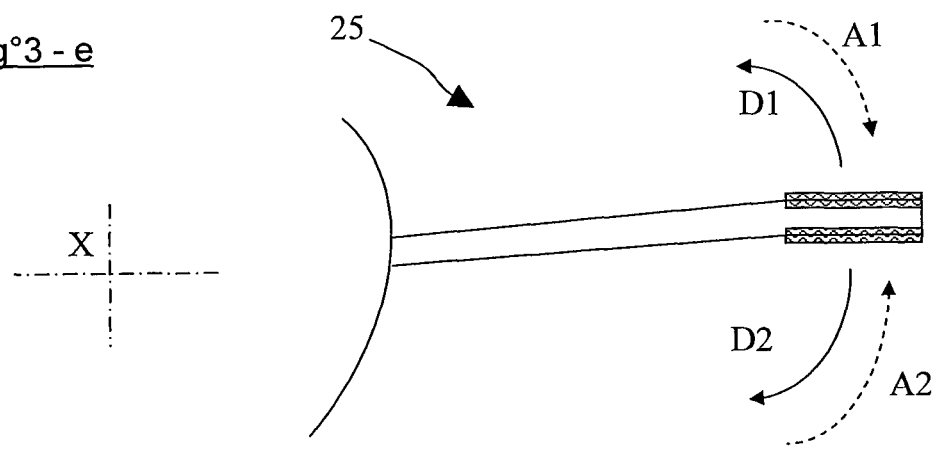

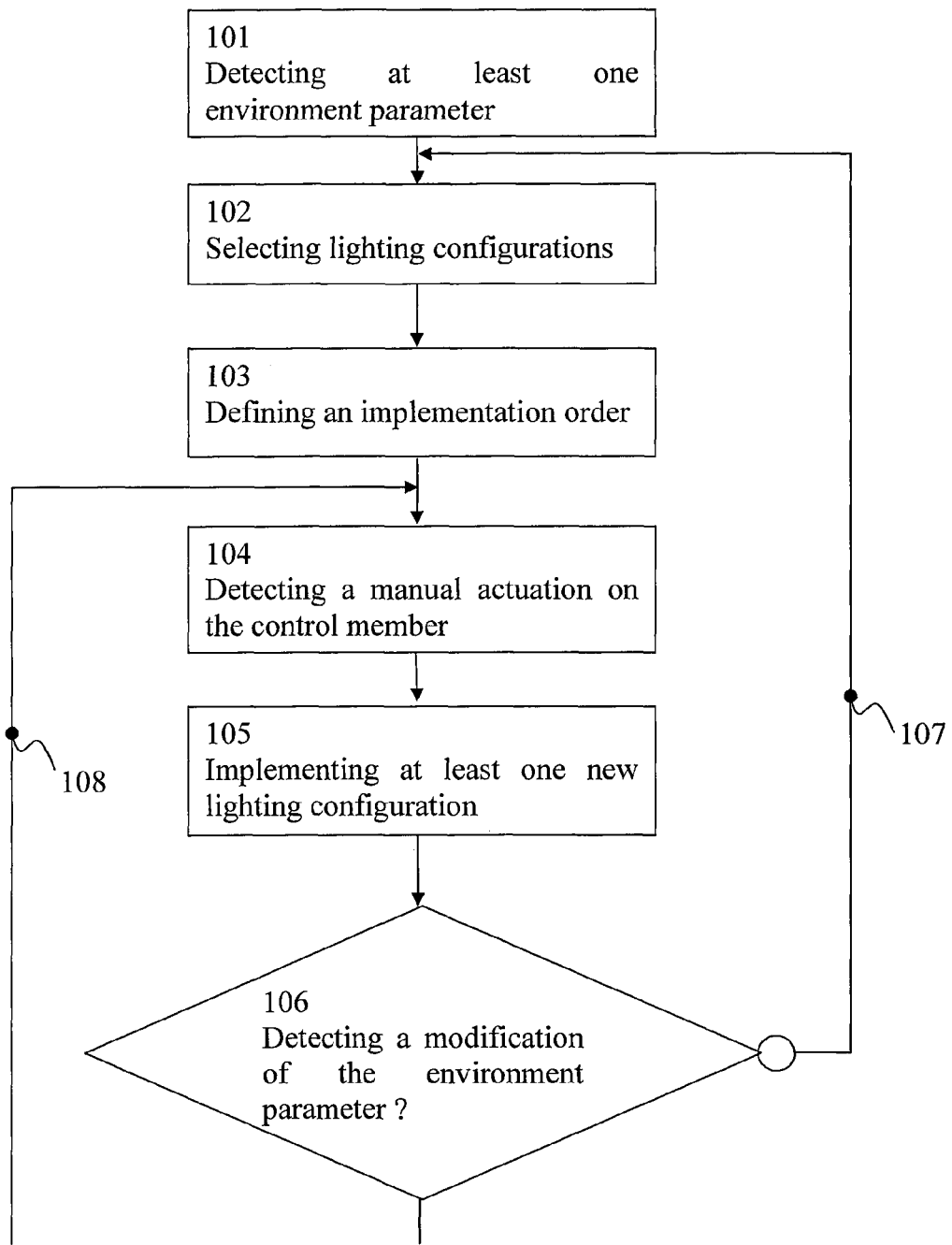

Fig° 5
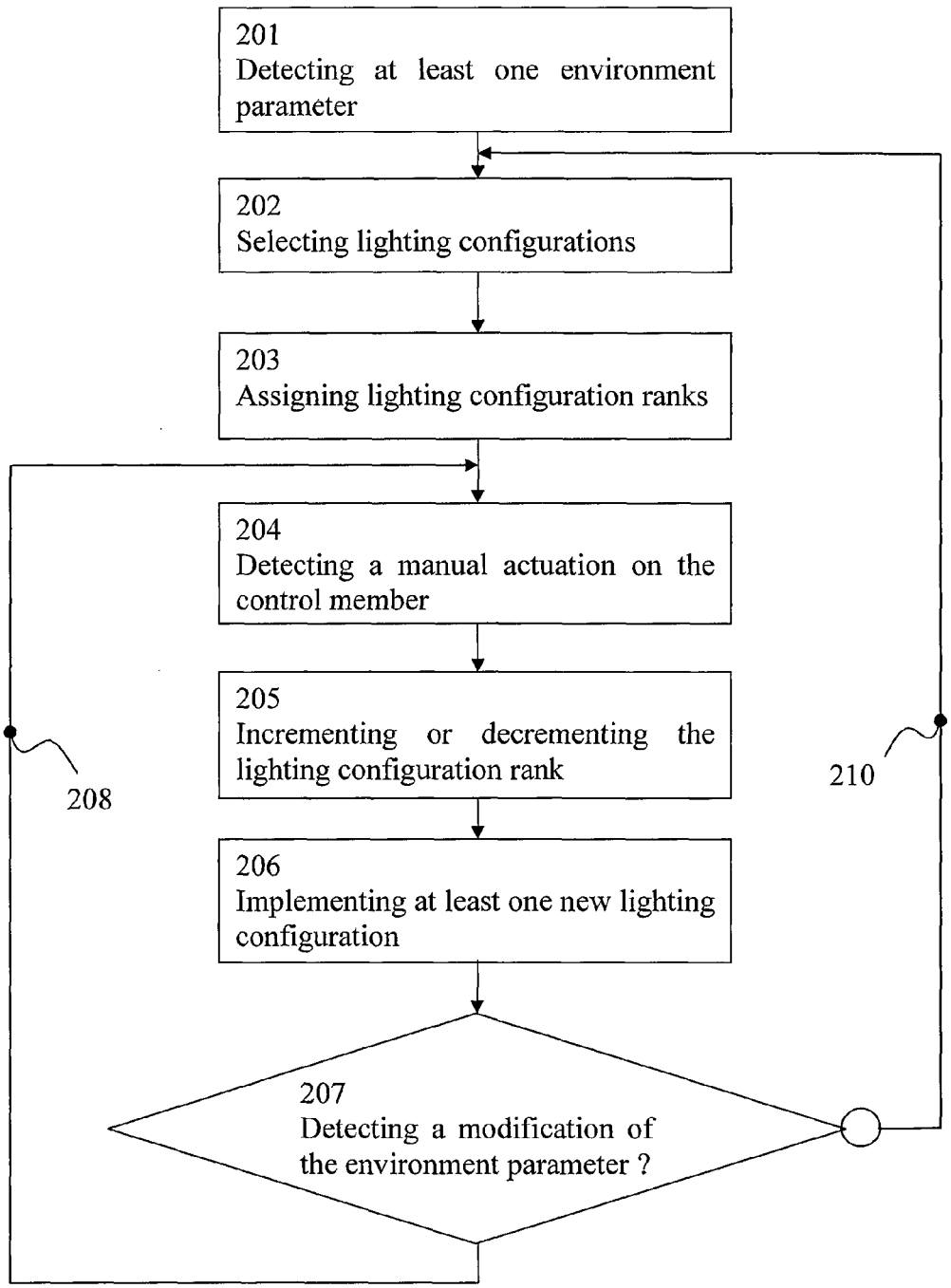

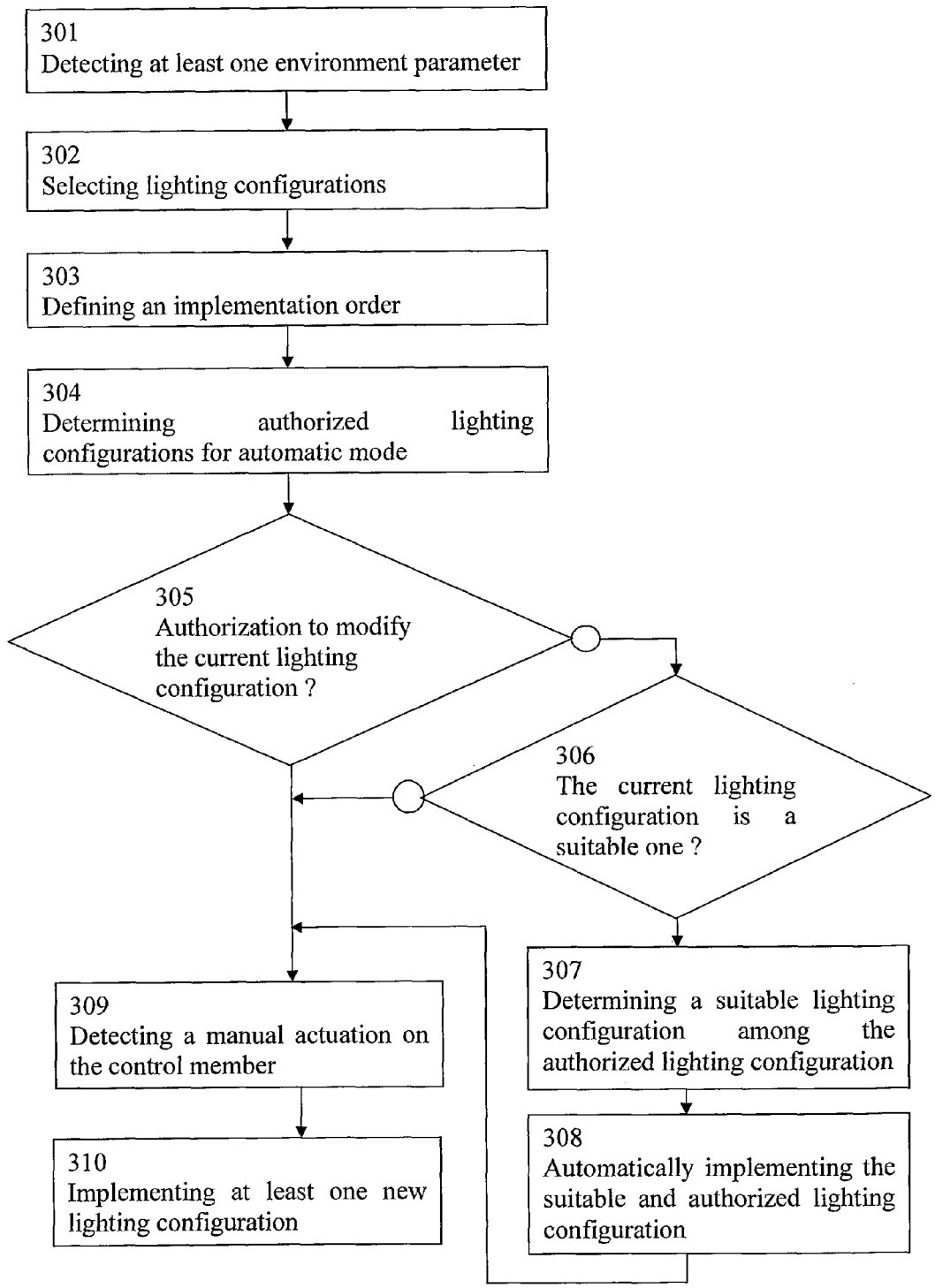

LIGHTING CONTROL SYSTEM AND METHOD FOR A MOTOR VEHICLE

BACKGROUND AND SUMMARY

The invention concerns a lighting control system and lighting control method for implementing and controlling external running lights of an automotive vehicle.

Traditionally, external running lights are controlled by rotary switches or by stalk switches. These switches are mechanical systems which can have a plurality of physical positions corresponding each to a lighting status of the external running lights.

Typically, in the case of a rotary switch or of a stalk switch, a first position of the switch denotes an OFF position of the lights; a second position of the switch denotes position lights ON and a third position denotes low/full beams ON.

Modern vehicles can be further equipped with a light sensor that can detect the intensity of daylight. Based on the information detected by the sensor a vehicle controller can turn on the vehicle lights to position lights or low beam, this occurring without any input from the driver.

It is also known, from WO 2010/076589, a lighting control system that has a manually operable member that can freely rotate around a central axis in order to allow the user to increment or decrement lighting configurations.

Such a lighting control system is more user friendly than the traditional systems and the fact that the control member can freely rotate and has no predefined position in relation to a lighting configuration makes it possible to disconnect the actual position of the control member and the actual lighting configuration. Thus in WO 2010/076589, the lighting configuration is not bound by the actual position of the control member. Such a lighting control system allows the driver to not be confused when for example the controller automatically turn on the vehicle lights to low beam.

Nevertheless in lighting systems of prior art and under some circumstances, the manual selection of lighting configurations doesn't result in an intuitive selection for the driver. In addition, such lighting control systems could lead to an improper and uncomfortable selection for the driver.

For instance, in case of foul weather such as heavy rain, fog, mist, snow . . . , the switching on of high beams is useless and in some circumstances may be dangerous because they could limit depth of driver's view field. Even if weather is for instance foggy the selection of high beams always remains possible for the driver that can implement by mistake such a lighting configuration.

In another example and when the driver is driving at night, the lighting system of the prior art gives to the driver the possibility to switch off all the lights. Without further explanation, it is easily understood that such a mistaken selection is very dangerous.

Consequently, it appears that prior lighting control systems lack of accuracy to allow the driver to switch on easily the appropriate external running lights.

Therefore, there is room for improvement in lighting control systems and lighting control methods for automotive vehicles.

In this technical context, it is desirable to improve the control of lighting equipment of an automotive vehicle especially by providing a lighting control system and a lighting control method of greater adaptability and accuracy, that limit the risk of mistaken selections and that result in more intuitive control for the driver.

To this end, an aspect of the invention concerns a lighting control system for an automotive vehicle having external running lights implementable in different available lighting configurations. Wherein the control system comprises in combination:

- a controller to control and implement lighting configurations,
- an input device that can be manually actuated,
- at least one sensor connected to the controller, that is able to detect at least one environment parameter and to transmit to the controller data corresponding to said parameter,
- a memory connected to the controller wherein different lighting configurations are stored.

The controller is configured to automatically select, depending on said environment parameter and among the different available lighting configurations, which lighting configurations can be implemented. The controller is also configured to automatically determine, depending on said parameter, in which order the selected lighting configurations are implemented when the input device is manually actuated.

The input device can be a manually operable control member movable in at least one direction, a touchpad or a control member partially or totally covered with a touch sensitive surface. A control member covered with a touch sensitive surface can be a motionless control member.

In the present application the touchpad or the touch sensitive surface is considered as being manually actuated or as receiving a manual actuation when it is contacted for instance by a finger of the driver or when a finger slides on it. The manually operable control member is considered as being manually actuated when it is operated and moved for instance by the finger or the hand of the driver.

Thanks to the lighting control system according to the invention, it is possible to configure the system in such a manner that the driver can only choose lighting configurations that are considered as useful depending on the value or the state of at least one environment parameter. Thanks to that it is avoided that the driver chooses improper lighting configurations. To make the selection more intuitive and more logical for the driver when he manually actuates the input device, the controller adapts, depending on the value or state of at least one environment parameter, the order in which the lighting configurations will be implemented (hereinafter the "implementation order"). For instance the implementation order of the lighting configurations can be modified depending on current weather or daylight conditions or depending on the state of the vehicle that can be determined by the activation or not of a vehicle sub-system or vehicle function such as the activation or not of the park brake. The detection of the park brake activation can be used by the lighting control system to determine for instance a prolonged stop of the vehicle.

According to advantageous but optional features considered on their own or in any technically feasible combination:
- the different available lighting configurations are stored in the memory according to at least two different lists, each list defining some selected lighting configurations and an implementation order of the selected lighting configurations when the control member is manually operated or when the touchpad or the touch sensitive surface receives a manual actuation;
- the controller is configured to automatically select, depending on at least one environment parameter, which list has to be implemented;
- the selected lighting configurations and/or the implementation orders are different from one list to another;
- the selected lighting configurations are stored in the memory, each selected lighting configuration being associated with a rank and, when the controller detects a motion of the manually operable control member in one direction or when it detects a finger motion on the touchpad or on the touch sensitive surface of the controller in one direction, it is configured to increment the active lighting configuration rank by at least one rank to define a new active lighting configuration rank and to control the implementation of at least one new lighting configuration that corresponds to the new active lighting configuration rank;

the control member is movable bidirectionally and a motion of the control member in one direction allows the incrementation of the lighting configuration rank and the motion of the control member in the opposite direction allows the decrementation of the lighting configuration rank;

the control member is movable in rotation about at least one axis;

the control member is a control member of the incremental type.

In the present application, the expression "incremental type" means that a new lighting configuration is implemented thanks to a motion of the control member and is not determined by the current position of the control member. After each manual actuation, the control member of the incremental type automatically returns to a neutral or to a rest position.

According to another advantageous but optional feature considered on its own or in any technically feasible combination with other features:

the control member is a freely rotating control member able to rotate bidirectionally about at least one axis.

The adverb "freely" means that the angular position of the control member doesn't assign a lighting configuration as defined here before. That also means that the control member has no angular end position and may be operated on several complete rotations around the rotation axis.

The fact that the control member can freely rotate and therefore as no predefined position in relation to the lighting configuration makes it possible to disconnect the actual position of the control member from the current lighting configuration. Thus the lighting configuration is not bound by the current position of the control member, unlike conventional switch wherein the position of the switch denotes the vehicle lighting configuration. For this type of control member there is no need to use reference numbers or any other indicator to mark the angular position of the control member. Thanks to this control member, lighting configuration can be automatically modified by the lighting control system without confusing the driver by indicating contradictory information.

According to other advantageous but optional features considered on their own or in any technically feasible combination:

the sensor is chosen among the followings:
light or sun sensor,
rain sensor,
fog sensor,
park brake sensor;

the controller is configured to automatically select which lighting configurations can be implemented and to automatically determine in which order the selected lighting configurations are implemented depending also on vehicle localization data;

Besides, a subject matter of the present invention is a lighting control method to implement, in an automotive vehicle, external running lights in different available lighting configurations. Precisely, the lighting control method is performed in an automotive vehicle that comprises:

a controller to control and implement lighting configurations,
an input device that can be manually actuated,
at least one sensor connected to the controller and able to detect at least one environment parameter.

Said lighting control method comprises the steps of:
detecting at least one environment parameter,
selecting among the different available lighting configurations and depending on the environment parameter, which lighting configurations can be implemented,
depending on the environment parameter, defining in which order the selected lighting configurations are implemented when the input device is manually actuated,
detecting a manual actuation on the input device,
depending on the motion of the input device or a motion on the input device, implementing at least one lighting configuration that is chosen among the selected lighting configurations according to the implementation order.

In the present application and when the input device is for instance a manually operable control member movable in at least one direction, a motion of the input device results from a manual actuation on the input device. When the input device is for instance a touchpad or a control member covered partially or totally with a touch sensitive surface, a motion on the input device may be a finger motion on the touch sensitive surface.

To be more precise, it can be envisaged the following steps:
detecting at least one environment parameter,
selecting among the different available lighting configurations and depending on the environment parameter, which lighting configurations can be implemented,
depending on the environment parameter, assigning to each selected lighting configuration a lighting configuration rank to define in which order the selected lighting configurations are implemented when the control member is manually operated,
detecting a manual actuation on the control member,
depending on the motion of the control member, incrementing or decrementing an active lighting configuration rank by at least one rank in order to define a new active lighting configuration rank,
among the selected lighting configurations; implementing the at least one lighting configuration that has a rank which corresponds to the new active lighting configuration rank.

In a preferred implementation of the inventive method and when the control member is movable bidirectionally, the motion of the control member in one direction allows the incrementation of the lighting configuration rank and the motion of the control member in the opposite direction allows the decrementation of the lighting configuration rank.

It can also be envisaged the following steps:
detecting a modification of the environment parameter,
determining if the modification of the environment parameter requests the selection of new lighting configurations among the different available lighting configurations,
selecting new lighting configurations among the different available lighting configurations and defining in which order the new selected lighting configurations are implemented.

In an advantageous implementation of the method
the controller is able to activate an automatic mode where some selected lighting configurations can be automatically implemented, and the method further comprises the following steps:
determining among the selected lighting configurations which lighting configurations are authorized to be automatically modified by the controller and which lighting configurations are authorized to be automatically implemented by the controller,
determining if the controller is authorized to automatically modify the current lighting configuration,
depending on at least one environment parameter, determining, among the lighting configurations authorized for automatic implementation, the at least one that is suitable,
without a manual actuation on the control member, automatically implementing the at least one lighting configuration that is suitable and authorized for automatic implementation.

In a preferred aspect of the inventive method, the lighting configurations that the controller is authorized to automatically modify and/or implement are different from one selection of lighting configurations to another selection.

In another implementation of the method when the input device is for instance a touchpad or a control member covered partially or totally with a touch sensitive surface, the method comprises the following steps:
detecting at least one environment parameter,
selecting among the different available lighting configurations and depending on said parameter, which lighting configurations can be implemented,
depending on said parameter, assigning to each selected lighting configuration a lighting configuration rank to define in which order the selected lighting configurations are implemented when the touchpad or the touch sensitive surface receives a manual actuation,
detecting a manual actuation on the touchpad or on the touch sensitive surface,
depending on a motion on the touchpad or on the touch sensitive surface of the control member, incrementing or decrementing an active lighting configuration rank by at least one rank in order to define a new active lighting configuration rank,
among the selected lighting configurations; implementing the at least one lighting configuration that has a rank which corresponds to the new active lighting configuration rank.

In another preferred aspect, the different steps of the inventive method are performed in an automatic manner by the lighting control system according to the invention.

BRIEF DESCRIPTION OF THE DRAWINGS

The invention will now be explained in correspondence with the annexed figures, as an illustrative example. In the annexed figures:

FIG. 1 is a schematic view of a lighting control system according to the invention, FIGS. 2a-2b are different schematic views of a control member according to the invention, FIGS. 3a-3e are schematic views of other control members according to the invention, FIG. 4 is a flow chart representing the main steps of a method according to the invention, FIG. 5 is a flow chart representing the main steps of a variation of the method according to another implementation of the invention, FIG. 6 is a flow chart representing the main steps of another variation of the method according to the invention.

DETAILED DESCRIPTION

The lighting control system is part of an automotive vehicle that may have an engine, an electric power source, a main electrical circuit and external running lights.

Conventionally, the external running lights include:
daytime running lights 7 (hereinafter "DRL")
position lights 8,
low beams 9,
high beams 10,
rear 1 and front fog lights 12.

External running lights may also include additional lights such as long range lights.

In the embodiment of FIG. 1, the lighting control system 1 includes a manually operable control member 2, also represented in FIG. 2 and that can rotate around one axis X. Such a manually operable control member 2 may be cylindrical, in the form of a wheel but it can also be of any other shape which would be convenient for the user. The control member 2 may be a freely rotating control member. The adverb "freely" means that the angular position of the control member doesn't assign by itself a lighting configuration as defined hereafter. That also means that the control member has no angular end position and may be operated on several complete rotations around the rotation axis.

As illustrated in FIGS. 3a-3e, the manually operable control member 2 may also be of the incremental type like for instance a pulse switch 21, 22, 23, 24 or pulse stalk 25 that may rotate (see control member 21, 25) or translate (see control member 22, 23, 24) around/along one axis X. Such a control member 2 may be moveable in one D1 or two directions D1, D2 and after a manual actuation it automatically returns A1, A2 to a rest position that can be a neutral position "0". The control member 3 may return to the rest position thanks to, for instance, a back-moving spring force.

Considering the control member illustrated in FIG. 2, rotations that are transmitted by the user to the control member 2 are converted into an electric and/or electronic signal by a suitable encoder (not represented) that may be, for instance, integrated to the control member 2. The control member 2 can be in this case directly connected to a controller 3. The controller 3 preferably includes a CPU (Central Processing Unit) 31 and non-volatile memory components 32 such as ROM (Read Only Memory). The controller 3 can also include other conventional components such as an input interface circuit, an output interface circuit and the like (not represented).

The controller 3 may be part of the vehicle electric system 1 and shared with other vehicle functions or to the contrary it can be dedicated to the lighting control system 1.

Several lighting configurations are preferably stored in the non-volatile memory 32 of the controller 3. The corresponding information may be loaded in the nonvolatile memory 32 by the vehicle manufacturer itself or after by a user who is authorized to modify lighting configurations for instance to adapt them to a specific application of the vehicle.

The different available lighting configurations that may be implemented in a vehicle may include:
all lights are switched OFF (hereinafter "switched OFF"),
daytime running lights ON (hereinafter "DRL ON"),
position lights ON,
low beams ON,
high beams ON,
front fog lights ON,
rear fog lights ON.

By default each preceding lighting configuration is in an OFF state.

The different available lighting configurations are not necessarily limited to those here-before mentioned but may also include some other lighting configurations that it is possible to implement in an automotive vehicle.

The controller 3 is also connected, directly or indirectly, to at least one sensor that is able to detect at least one environment parameter. Such a sensor may be a light sensor 4 that is able to detect daylight intensity.

Without limitation and such as illustrated in FIG. 1, the lighting control system may also include a rain sensor 5, a fog sensor 6. It can also be envisaged that the lighting control system comprises one or several further light sensors (not represented) that are able, for instance, to detect at night another vehicle passing by in the other direction.

Data relative to the environment parameter can be transmitted to the controller 2 either directly via a specific wire or via a CAN bus (Controller Area Network) 14 when the vehicle is equipped with such a bus or to the contrary data can be transmitted indirectly via a dedicated ECU (Electronic Control Unit) 15 and then through the CAN bus 14.

Environment parameters can also include data relative to the state of a vehicle sub-system or function such as for instance data relative to the activation or not of the vehicle park brake. Such an environment parameter can be detected by a sensor and the corresponding data can be transmitted to the controller thanks to a dedicated ECU, for instance the EPB ECU (Electronic Park Brake ECU) 16, and then through the CAN bus 14. In another configuration of the vehicle, such an environment parameter can be detected by an ECU itself, without the use of sensors, and transmitted to the controller through the CAN bus 14.

The CPU 31 of the controller 3 is configured to select among the different available lighting configurations which lighting configurations can be implemented depending on the environment parameter, more precisely which lighting configurations can be implemented depending on the value or state of the environment parameter or depending on the value or state of a combination of environment parameters. The selected lighting configurations are also identified in the description as a selection of lighting configurations. Depending on the different values or states of the environment parameter, the CPU 31 may determine different selections of lighting configurations and each selection can be identified accordingly. Preferably each selection of lighting configurations is stored in the non-volatile memory 32 of the controller 3.

For instance, when the vehicle is provided with a sensor that is able to detect daylight intensity (light sensor 4), at least two different selections of lighting configurations may be determined by the CPU 31 a selection where luminosity is intense, this first selection may be identified as a "Day Selection" by the lighting control system and a selection where luminosity is low, this second selection may be identified as a "Night selection". Depending on the accuracy of the light sensor 4, some intermediate selections may also be determined such as "Twilight Selection" or "Sunrise Selection".

Thanks to the environment parameter data produced by the light sensor 4 and transmitted to the controller 3, the CPU 31 may determine that among the different available lighting configurations, which lighting configurations are suitable. If the light sensor 4 detects an intense luminosity, the controller 3 can for instance determine that a suitable selection is a "Day Selection" and select the following lighting configurations as possible and implementable lighting configurations:

DRL ON,
position lights ON,
low beams ON.

In this illustrative example, the controller 3 is for instance programmed to not select fog lights ON as a possible implementable lighting configuration because in case of the Day Selection this configuration is considered as useless and might confused the driver or make longer for the driver to choose the relevant lighting configurations.

If to the contrary, the controller 3 determines, thanks to the environment parameter, that the suitable lighting configurations are those corresponding to a "Night Selection", the controller 3 can select the following lighting configurations as implementable configurations:

parking lights ON,
low beams ON,
high beams ON,
long range lights ON.

In another example, if the data produced by the sensor 6 or if the combined data produced by sensors 4, 5 may allow the controller 3 to determine that the suitable lighting configurations are those corresponding to a foggy weather (hereinafter "Fog Selection"), the controller 3 can then select the following lighting configurations as possible and implementable configurations:

parking lights ON,
low beams ON,
front fog lights ON,
Rear fog lights ON.

In this other illustrative example the controller 3 is for instance programmed to not select high beams that are considered as not adapted in case of deep fog.

The preceding selections are not limited and some other selections may exist like a Raining selection.

For each selection and depending on the at least one environment parameter, the CPU 31 of the controller 3 may automatically adjust the order (hereinafter an "implementation order") in which the selected lighting configurations will be implemented when, for instance, the control member 2 of FIG. 2 is manually rotated.

To define an implementation order the controller 3 may automatically assigns to each selected lighting configuration a lighting configuration rank (hereinafter a "rank") that determines in which order the selected lighting configurations will be implemented when the control member 2 is manually rotated.

The lighting configuration ranks associated to each lighting configuration are preferably stored in the non-volatile memory 32.

For instance in case of "Day Selection":
DRL ON may receive the rank "0",
DRL ON and position lights ON may receive the rank "1",
position lights ON and low beams ON may receive the rank "2".

We can notice that several lighting configurations may receive the same rank and therefore be implemented at the same time. For example, in the Day Selection DRL ON and low beams ON may be implemented together because they receive the same rank "2".

It is also noticed that different ranks can be attributed to one lighting configuration meaning, for instance, that one lighting configuration can remain activated even if a new actuation of the control member cause an incrementation or decrementation of the lighting configuration rank.

In case of "Night Selection":
position lights ON and low beams ON may receive the rank "0", position lights ON and high beams ON may receive the rank "1",
position lights ON and long range lights ON may receive the rank "2".

In case of "Fog Selection":
position lights ON and low beams ON may receive the rank "0"
position lights ON, low beams ON and rear fog lights ON may receive the rank
position lights ON, low beams ON, rear fog lights ON and front fog lights ON if high beams may receive the rank "2".

A particular advantage of the invention is that the same control member 2 can be used by the driver to select and switch ON successively all the external running lights of the vehicle including those that corresponds to the fog lights. This is due to the fact that the inventive lighting control system is able to select lighting configurations that are chosen among all the different available lighting configurations and that can then be implemented by the system when the control member 2 is manually operated. To the contrary, in conventional lighting control system, it is known to provide at least one additional control member such as a switch button or a rotary knob to allow for instance the driver to switch ON fog lights. Such an additional control member make more complex the human interface of the conventional lighting control systems and it is often more difficult for the driver to find this additional control member.

According to the invention, the controller may automatically decide to replace a current selection of lighting configurations by another if following a variation or a modification of an environment parameter the other selection is more suitable than the current one.

Furthermore, according to the invention, environment parameters could also include vehicle parameters such as the state of a vehicle sub-system or the state of a vehicle function. For instance another environment parameter could be the activation or non-activation of the park brake system detected by EPB ECU 16, the speed of the vehicle or detection of door opening.

In case of activation of the park brake system, that can mean that the vehicle is in a stop state. In such a case, the controller 3 can automatically switch from a current selection of lighting configurations that doesn't take into account the activation of park brake system to another selection that take into account this new environment parameter.

So resulting from this new parameter, the controller can define three new selections of lighting configurations, which respectively can be: Park brake+Day Selection, Park brake+Night Selection, park brake+Fog Selection.

For instance in case of detection of an intense luminosity and detection of park brake activation the CPU 31 can select new lighting configurations where the "switched OFF" lighting configuration is a new implementable lighting configuration and where the new implementation order is defined as following:
switched OFF receives the rank "0",
DRL ON receives the rank "1",
DRL ON and position lights ON receives the rank "2",
position lights ON and low beams ON receive the rank "3".
This selection can be identified by the system as a "Park brake+Day Selection".

In case of detection of low luminosity and detection of park brake activation the CPU 31 can select new lighting configurations where "switched OFF" and "daytime running lights ON" are new implementable lighting configurations. To the contrary "High beams" and "Long range lights" can be cancelled in this selection. The new implementation order can be defined as following:
switch OFF receives the rank "0",
DRL ON receives the rank "1",
DRL ON and position lights ON receive the rank "2",
position lights ON and low beams ON receive the rank "3".
This selection can be identified by the system as "Park brake+Night Selection".

In case of detection of foggy weather and detection of park brake activation, the selected lighting configurations and the new implementation order can be defined as following:
switch OFF receives the rank "0",
daytime running lights ON receives the rank "1",
position lights ON and low beams ON may receive the rank "2",
position lights ON, low beams ON and rear fog lights ON may receive the rank "3".

It is noticed that the controller can determine for different environment parameters such as detected by the system the same selections of lighting configurations with the same or different implementation order.

According to another embodiment of the invention, lighting configurations are stored in memory components 32 according to at least two different lists. Each list corresponds to a pre-selection of lighting configurations ("Day Selection", "Night Selection", "Fog Selection" . . . ) and defines an implementation order of the lighting configurations. The controller 3 is configured to automatically select, depending on at least one environment parameter, which list has to be implemented. The lists can be loaded in the non-volatile memory 32 by the vehicle manufacturer itself or by an authorized user (by a professional truck bodybuilder for instance when the vehicle is a truck).

In the here before embodiment and because there are six selections of lighting configurations (Day Selection, Night Selection, Fog Selection, Park brake+Day Selection, Park brake+Night Selection, park brake+Fog Selection), the six lists can be provided and stored in the memory 32. Then depending on the environment parameters, the controller 3 determines what is the suitable list.

It is noticed that the same lighting configuration rank may correspond, in different selections, to different lighting configurations. For instance, if it is compared "Day Selection", "Night Selection" and "Fog Selection": rank "2" corresponds for each selection to different lighting configurations.

It is also important to notice that the lighting configuration(s) corresponding to the rank "0" can also be different from one selection to another. Furthermore the number of ranks can be different from one selection to another meaning that the number of lighting configurations that it is possible to implement can be different from one selection to another.

As previously explained the control member 2 of FIG. 2 can be a freely rotating control member that is able to rotate bidirectionally about at least one axis X. It may also be a control member of the incremental type 21, 22, 23, 24, 25 such as represented in FIG. 3. Those control members can move in one direction D1 or in two directions D1, D2. In a different manner from the freely rotating control member that stays at the current position when the user releases it, the control members of FIGS. 3a-3e are automatically brought back into a rest position when the user releases the control member thanks to a restoring force for instance a spring force.

Consequently, in a further embodiment the control member may be a pulse switch 22 that may translate in only one direction D1 (FIG. 3-b). In this case a pulse of the control member 22 in this direction D1 allows the incrementation of the active lighting configuration rank by one unit. When the maximum rank is reached a new pulse on the pulse switch 22 allows the reset of the lighting configuration rank at the rank "0" that corresponds to a neutral lighting configuration. In this embodiment the control member is preferably moveable in only one direction D1, however it could also be a bidirectional control member like the control member 21 illustrated in FIG. 3a, in this case the actuation of the control member 21 in the other direction D2 has no effect.

In a variation of the invention the control member can be a bidirectional one such as illustrated in FIG. 2, 3a, 3c, 3d or 3e so that an actuation of the control member 2, 21, 23, 24, 25 in a first direction D1 allows the incrementation of the lighting configuration rank and the actuation of the control member in the other direction D2 allows the decrementation of the lighting configuration rank.

Considering the freely rotating control member 2 as illustrated in FIG. 2, each clockwise rotation of the control member 2 can increment the active lighting configuration rank by at least one unit for instance from rank "0" to rank "1", from rank "1" to rank "2" and so forth. Each rotation of the control member in a counterclockwise direction D2 can decrement the active lighting configuration rank by at least one unit for instance from rank "2" to rank "1", from rank "1" to rank "0".

Of course, depending on the amplitude of the angular rotation of the control member, the clockwise or counterclockwise rotation of the control member can increment or decrement the active lighting configuration rank by two units or more and for instance from rank "0" to rank "2" (incrementation) or from rank "3" to rank "1" (decrementation).

In addition, a further rotation of the control member 2 in the clockwise direction D1 allows a new incrementation of the lighting configuration rank (ex: from rank "2" to rank "3") and successive rotations of the control member in the same direction D1 allows the incrementation of the active rank by several ranks until the maximum rank is reached.

In the other side, successive rotations of the control member in the counterclockwise direction D2 can decrement the lighting configuration rank until rank "0".

If the control member is a pulse rotating control member such as represented in FIG. 3-a. Each manual pulse on the control member 21 in a clockwise direction D1 can increment the lighting configuration rank from one unit (ex: from rank "1" to rank "2") whereas each pulse in a counterclockwise direction D2 can decrement the lighting configuration rank (ex: from rank "2" to rank "1"). When after each pulse the pulse rotating control member 21 is released by the user, the pulse rotating control member 21 is automatically brought back into a physical rest position such as illustrated in FIG. 3-a where the slash 211 is facing to the number reference "0".

If the control member is a double switch button 23 such as illustrated in FIG. 3-c each pulse on the "+" part of double switch button 23 allows the incrementation of the lighting configuration rank by one unit (ex: from rank "1" to rank "2") whereas each pulse on the "−" part allows the decrementation of the lighting configuration rank (ex: from rank "2" to rank "1").

The control member could also be a pulse actuator 24 (FIG. 3-d) that can translate into two opposite directions D1, D2 such as illustrated on FIG. 3-e. In this different embodiment a manual pulse on the actuator 24 in a first direction D1 allows the incrementation of the active lighting configuration rank from one unit (ex: from rank "1" to rank "2") whereas a pulse in the opposite direction D2 allows the decrementation of the active lighting configuration rank (ex: from rank "2" to rank "1"). When the pulse actuator 24 is released by the user, the pulse actuator 24 is automatically brought back into a physical rest position as represented on FIG. 3-d.

If the control member is a pulse stalk 25 such as illustrated in FIG. 3-e each manual pulse on the pulse stalk in the counterclockwise direction D1 can increment the lighting configuration rank from one unit (ex: from rank "1" to rank "2") whereas each pulse in a clockwise direction D2 can decrement the lighting configuration rank (ex: from rank "2" to rank "1"). When the pulse stalk 25 is released by the user after each clockwise or counterclockwise pulse, the pulse stalk is automatically brought back into a physical rest position as represented in FIG. 3-e.

Concerning control members of FIGS. 3a-3e, only a minimum displacement of control members 21-25 allows the incrementation or decrementation of the lighting configuration rank. When the control member is a rotating control member 2, 21, 25 the minimum displacement is preferably higher than 10° and when the pulse actuator is a translating control member 24 the minimum displacement is preferably higher than 5 mm.

Concerning the rotating control member 2 of FIG. 2, an incrementation or decrementation of the lighting configuration rank can be materialized by a rotation of the control member 2 comprised between 10° and 180° and preferably comprised between 10° and 60°.

In a further embodiment the data corresponding to at least one environment parameter and transmitted by the sensor 4 (or set of sensors 4, 5, 6 . . . ) to the controller 2 can be coupled to vehicle localization data (like GPS data) in order for instance to detect when the vehicle is running through a tunnel and to allow the controller 3 to determine a specific selection for such particular and temporary conditions.

Optionally, the controller 2 can also be connected to a display equipment 13 (FIG. 1) that can include a plurality of standard pictograms 131, 132, 133. The display equipment 13 can be integrated in the vehicle dashboard 20 or can be projected on the vehicle windscreen.

The first pictogram 131 may indicate what is current selection of lighting configurations. (Day Selection, Night Selection, Fog Selection, Park brake+Day Selection, Park brake+Night Selection, park brake+Fog Selection). The second pictogram may indicate what is/are the current lighting configuration(s), in other words what is/are the lighting configuration which is/are currently implemented. The third pictogram may for instance indicate if the system is in a manual mode or an automatic mode such as hereafter detailed with reference to FIG. 6.

Reference will now be made to the FIG. 4 that represents a block diagram of a method according to the invention. This method comprises the following main steps:

step 101: at least one sensor 4, 5, 6 or at least one ECU 16 (i.e.: EPB ECU) detects at least one environment parameter, step 102: the controller 3 selects, in an automatic manner, among the different available lighting configurations of the vehicle and depending on the at least one environment parameter, which lighting configurations can be implemented, in other word the controller determines a selection of lighting configurations, step 103: the controller 3 assigns, in an automatic manner and depending on the at least one environment parameter, to each selected lighting configuration an implementation order that determines in which order the selected lighting configurations are implemented when the control member 2 is manually operated, step 104: the lighting control system 1 detects a manual actuation on the control member 2, step 105: depending on the motion of the control member 2, the lighting control system 1 implements at least one new lighting configuration that is chosen among the selected lighting configurations according to the implementation order.

If in an additional step 106 the environment parameter or at least one of the environment parameters is modified or if the value that is measured by sensors 4, 5, 6 varies by more than a predetermined threshold value or if the state of a vehicle sub-system or function is modified, the controller 3 may decide 107 to automatically select a new set of lighting configurations in order to adapt the set of implementable lighting configurations with regard to the modified environment parameter. A new implementation order is defined in step 103 and depending on a motion of the control member the lighting control system 1 implements at least one new lighting configuration 104, 105.

If the environment parameter remains unchanged or under a threshold value, the lighting control system 1 maintains 108 the current selection of lighting configurations and maintains the current lighting configuration until the detection of a new manual actuation on the control member 104.

In a preferred embodiment the controller can replace the current selection of lighting configurations by another selection only if in the new selection, the current lighting configuration exists and can also be implemented.

According to particular implementation of the method represented on FIG. 5, a method according to the invention comprises the following steps:
  step 201: at least one sensor 4, 5, 6 or at least one ECU 16 (i.e.: EPB ECU) detects at least one environment parameter,
  step 202: the controller 3 selects, among the different available lighting configurations of the vehicle, in an automatic manner and depending on the at least one environment parameter, which lighting configurations can be implemented (selection of lighting configurations),
  step 203: the controller 3 assigns, in an automatic manner and depending on the environment parameter, to each selected lighting configuration a rank that determines in which order the selected lighting configurations are implemented when the control member 2 is manually operated,
  step 204: the lighting control system 1 detects a manual actuation on the control member 2,
  step 205: depending on the motion of the control member, the controller increments or decrements the active lighting configuration rank,
  step 206: the lighting control system 1 implements the at least one lighting configuration that has a rank which corresponds to the new active lighting configuration rank,
  step 207: if the lighting control system 1 detects a modification of the environment parameter, new lighting configurations can be selected 210, 202 (new selection of lighting configurations).

Optionally, if the control member 2 is a bidirectional one 2, 21, 23, 24, 25 in step 204 the lighting control system 1 detects in which direction the control member 2, 21, 23, 24, 25 is manually actuated and in step 205, depending on the direction of actuation of the control member 2, the controller 3 increments or decrements the lighting configuration rank. For instance, if the control member 2, 21, 23, 24, 25 is actuated in one direction D1 the lighting configuration rank may be incremented and if the control member 2 is actuated in the other direction D2 (for instance in an opposite direction) lighting configuration rank may be decremented.

In another variation (not represented) of the method according to the present inventive, each lighting selection corresponds to a predefined list of lighting configurations wherein lighting configurations are ordered in accordance with predetermined ranks and the method comprises the following steps:
  step 1: the at least one sensor detects at least one environment parameter,
  step 2: the controller selects, in an automatic manner, depending on the at least one environment parameter and among several predefined lists, the suitable one,
  step 3: the lighting control system detects a manual actuation of the control, member,
  step 5: the controller increments or decrements in the selected list the active lighting configuration rank,
  step 6: the lighting control system implements the at least one lighting configuration that has a rank which corresponds to the new active lighting configuration rank.

In other words, the steps 202 and 203 of the previous method are implemented by selecting one list amongst a plurality of predefined lists.

In an advantageous method according to the present invention the controller is able to activate an automatic mode where some selected lighting configurations can be automatically implemented. The method comprises the steps illustrated in FIG. 6, namely:
  Step 301: at least one sensor 4, 5, 6 or at least one ECU 16 (i.e.: EPB ECU) detects at least one environment parameter,
  step 302: the controller 3 selects, among the different lighting configurations, in an automatic manner and depending on the at least one environment parameter, which lighting configurations can be implemented,
  step 303: the controller 3 assigns, in an automatic manner and depending on the environment parameter, to each selected lighting configuration an implementation order that determines in which order the selected lighting configurations are implemented when the control member 2 is manually operated,
  step 304: the lighting system 1 determines, among the selected lighting configurations, which lighting configurations are authorized to be automatically modified by the controller 3 and which lighting configurations are authorized to be automatically implemented by the controller 3,
  step 305: depending on the authorized lighting configurations and depending on the current lighting configuration, the lighting system 1 determines if the controller 3 is authorized to automatically modify the current lighting configuration,
  step 306: depending on at least one environment parameter, the controller 3 checks if the current lighting configuration is a suitable one,
  step 307: if the current lighting configuration is not a suitable one the controller 3 determines, among the other authorized lighting configurations and depending on at least the environment parameter of step 306, the at least one that is suitable for implementation,
  step 308: without a manual actuation on the control member, the lighting system 1 automatically implements the at least one lighting configuration that is suitable and authorized for automatic implementation.

The environment parameter such as mentioned in step 306 and 307 can be the same than the one mentioned in step 301 or can be a different one. Preferably the controller selects among the other authorized lighting configurations the at least one that is the most suitable for implementation.

If the controller 3 is not authorized to automatically modify the current lighting configuration (step 305), only a manual actuation on the control member (step 309) allows, in the same selection, the implementation of at least one new lighting configuration (step 310).

The table 1 below illustrates an example of selections of lighting configurations wherein lighting configurations are selected depending on three environment parameters.

The three environment parameters are light intensity that is detected by light sensor 4, rain that is detected by a humidity sensor 5 (rain sensor), foggy weather that is detected thanks to light and humidity sensors 4, 5.

The table 2 illustrates another example of selections of lighting configurations where lighting configurations are selected depending on three different environment parameters. Instead of foggy weather, the park brake activation (PB) is detected by the EPB ECU 16 and the corresponding data are transmitted from the EPB ECU 16 to the controller 3 through the CAN bus 14.

depending on the three environment parameters. The selected lighting configurations are distributed into selections of lighting configurations such as named in the second column.

The fourth column "Attribution of ranks" contains the selected lighting configurations which are ranked depending on the environment parameters.

The content of table 2 differs from table 1 because it includes additional lighting selections that result from the detection of the Park-brake activation and also differs because Fog Selection is cancelled.

Day, Night and Rain Selections correspond to some selections where the park brake activation is not detected. To the contrary in Day+PB, Night+PB and Rain+PB Selections a park brake activation is detected by the system.

The last three selections differ from the first ones mainly because they offer to the driver the possibility to choose a Switched OFF lighting configuration where all the lights are switched OFF.

TABLE 1

| Available Lighting configurations | Selection | Selected lighting configurations | Attribution of ranks (implementation order) |
|---|---|---|---|
| All lights switched OFF daytime running lights ON position lights ON low beams ON high beams ON rear fog lights ON front fog lights ON | Day | DRL ON position lights ON low beams ON | "0"/DRL ON "1"/DRL ON + position lights ON "2"/position lights ON + low beams ON |
| | Night | position lights ON low beams ON high beams ON long range lights ON | "0"/position lights ON + low beams ON "1"/position lights ON + high beams ON "2"/position lights ON + long range lights ON |
| | Rain | DRL ON position lights ON low beams ON | "0"/DRL ON "1"/DRL ON + position lights ON "2"/position lights ON + low beams ON |
| | Fog | position lights ON low beams ON rear fog lights ON front fog lights ON | "0"/position lights ON + low beams ON "1"/position lights ON + rear fog lights ON "2"/position lights ON + rear fog lights ON + front fog lights ON |

| Available Lighting configurations | Selection | Selected lighting configurations | Attribution of ranks (implementation order) | Automatic mode |
|---|---|---|---|---|
| All lights switched OFF daytime running lights ON position lights ON low beams ON high beams ON rear fog lights ON front fog lights ON | Day | DRL ON position lights ON low beams ON | "0"/DRL ON "1"/DRL ON + Positions lights ON "2"/Positions lights ON + low beams ON | "0"/AUTO |
| | Night | position lights ON low beams ON high beams ON long range lights ON | "0"/position lights ON + low beams ON "1"/position lights ON + high beams ON "2"/position lights ON + long range lights ON | "0"/AUTO |
| | Rain | DRL ON position lights ON low beams ON | "0"/DRL ON "1"/DRL ON + position lights ON "2"/position lights ON + low beams ON | "0"/AUTO "1"/AUTO "2"/AUTO |
| | Day + PB | switch OFF DRL ON position lights ON low beams ON | "0"/switch OFF "1"/DRL ON "2"/DRL ON + position lights ON "3"/position lights ON + low beam | "0"/AUTO "1"/AUTO |
| | Night + PB | switched OFF DRL ON position lights ON low beams ON | "0"/switch OFF "1"/ DRL ON "2"/DRL ON + position lights ON "3"/position lights ON + low beam | "0"/AUTO "1"/AUTO "2"/AUTO |
| | Rain + PB | switched OFF DRL ON position lights ON low beams ON | "0"/switch OFF "1"/DRL ON "2"/DRL ON + position lights ON "3"/position lights ON + low beam | "0"/AUTO "1"/AUTO |

In table 1, the first column "Available Lighting configurations" lists different available lighting configurations of the vehicle that are stored in the non-volatile memory 32 and that the lighting control system 1 is able to implement.

In the second column "Selection" the selections of lighting configurations are named. Rain Selection is a new selection compared to the preceding parts of the description.

In the third column "Selected Lighting configurations" the lighting configurations have been selected by the controller 3

In a preferred embodiment of the method such as illustrated in FIG. 6, the controller is able to activate an automatic mode where some lighting configurations, chosen among the selected lighting configurations, can be automatically implemented.

The last column "Automatic mode" of table 2 includes, in combination with lighting configuration rank, information relative to the possible automatic activation or not of the corresponding lighting configuration(s). When "AUTO" is indicated for a given rank that means that:
from this rank the controller is authorized to activate the automatic mode and to automatically modify, without any activation of the controller member, the current lighting configuration(s) corresponding to this rank, and the controller can automatically implement another lighting configuration(s) that is chosen among the selected lighting configurations of the same selection and whose the corresponding rank is marked "AUTO" in the last column.

EXAMPLE 1

The following example 1 is described in accordance with FIGS. 1 & 2, with table 1 and with the method described in FIG. 5.

Thanks to the environment parameter data received by the controller 3 from sensors 4, 5, 6, the controller 3 may determine that it is raining (second column in table 1, step 201) and selects among the several available lighting configurations (first column) the suitable lighting configurations (third column in table 1, step 202):
DRL ON
Position lights ON
Low beams ON This selection is namely identified as being a Rain Selection (second column in table 1). By performing this selection the controller 3 avoids the selection of some lighting configurations that are useless or not safe when it is raining or that may confuse the driver who needs to select a new lighting configuration.

Then, the controller 3 assigns a lighting configuration rank (fourth column in table 1, step 203) to each selected lighting configuration to order them in such manner that the order corresponds to an intuitive selection for the user when he actuates the controller member:
DRL ON receives the rank "0",
DRL ON+position lights ON receive the rank "1",
position lights ON+low beams ON receive the rank "2".

In the rain selection, for safety reasons and to comply with some regulations, it can be preferred that the neutral lighting configuration is "daytime running lights ON" (DRL ON) instead of "Switch OFF".

If the rain becomes stronger, the driver may decide to implement lows beams ON configuration. To implement "lows beams ON" configuration the driver turns the control member 2 in a clockwise direction D1. The lighting control system 1 detects the clockwise rotation of the control member 2 (step 204) and increments the lighting configuration rank from "0" to "1" (step 205) and the lighting control system 1 implements the selected lighting configurations that corresponds to the rank "1" (step 206). In this case the corresponding lighting configurations are "DRL ON" and "position lights ON".

As explained here before, a rotation of the control member 2 is detected by the lighting system preferably if the angular amplitude of the rotation exceeds a threshold value that could be for instance 10°.

In the same manner, if the driver turns a second time the control member 2 in a clockwise direction D1 (steps 208, 204), the controller increments (step 205) the lighting configuration rank from "1" to "2" and the lighting control system implements "position lights ON" and "low beams ON" lighting configurations.

We can notice that ranks "1" and "2" are assigned to the lighting configuration "position lights ON", in the present example, that means, that position lights remain switched ON from rank "1" to rank "2" when in the meantime daytime running lights are switched OFF and low beams are switched ON.

On the other hand, if the driver wants 208 to come back in a lighting status where position lights are switched ON without low beams, he turns in a counterclockwise direction D2 the control member 2. The lighting control system 1 detects (step 204) the counterclockwise rotation of the controller member 2 and the controller 3 decrements the lighting configuration rank from "2" to "1" (step 205). The lighting control system 1 implements (step 206) the corresponding lighting configurations DRL ON+position lights ON so that positions lights remain switched ON, DRL are switched ON and low beams are switched OFF.

In the same manner, if the driver wants to come in a lighting status where only DRL lights are switched ON he turns once again the controller member 2 in a counterclockwise direction D2.

If the lighting control system 1 detects a modification of the environment parameter (steps 207, 210), new lighting configurations can be selected (step 202) and re-ordered by the controller (step 203) so that the preceding manual actuations on the control member don't cause the same implementations of lighting configurations.

It should be understood that the invention is not restricted to the embodiments described above by way of non-limiting example, but on the contrary it encompasses all embodiments thereof.

For instance instead of having a manually operable control member movable in at least one direction such as represented in FIGS. 2, 3a-3e, the manually operable control member may be replaced by any other input device that can be actuated by the driver. For instance another input device can be a touchpad or a motionless control member partially or totally covered with a touch sensitive surface. The driver can slide his finger on the touch sensitive surface in a first direction to increment the lighting configuration rank and slide his finger in a second direction to decrement the lighting configuration rank.

The invention claimed is:

1. A lighting control system for an automotive vehicle having external running lights implementable in different available lighting configurations, the control system comprising:
a controller to control and implement lighting configurations,
an input device that can be manually actuated,
at least one sensor connected to the controller, that is able to detect at least one environment parameter and to transmit to the controller data corresponding to the parameter,
a memory connected to the controller wherein different lighting configurations are stored,
wherein
the controller is configured to automatically select, depending on the parameter and among the different available lighting configurations, which lighting configurations can be implemented and is configured to automatically determine in which order the selected lighting configurations are implemented when the input device is manually actuated.

2. A lighting control system according to claim 1, wherein the input device is a manually operable control member movable in at least one direction.

3. A lighting control system according to claim 2, wherein different available lighting configurations are stored in the memory according to at least two different lists, each list defining some selected lighting configurations and an implementation order of the selected lighting configurations when the control member is manually operated and wherein the controller is configured to automatically select, depending on at least one environment parameter, which list has to be implemented.

4. A lighting control system according to claim 3, wherein the selected lighting configurations and/or the implementation orders are different from one list to another.

5. A lighting control system according to claim 3, wherein the selected lighting configurations are stored in the memory, each selected lighting configuration being associated with a rank and, when the controller detects a motion of the control member in one direction, it is configured to increment the active lighting configuration rank by at least one rank to define a new active lighting configuration rank and to control the implementation of at least one new lighting configuration that corresponds to the new active lighting configuration rank.

6. A lighting control system according to claim 5, wherein the control member is movable bidirectionally and a motion of the control member in one direction allows the incrementation of the lighting configuration rank and the motion of the control member in the opposite direction allows the decrementation of the lighting configuration rank.

7. A lighting control system according to claim 6, wherein the control member is movable in rotation about at least one axis (X).

8. A lighting control system according to claim 2, wherein the control member is a control member of the incremental type.

9. A lighting control system according to claim 7, wherein the control member is a freely rotating control member able to rotate bidirectionally about at least one axis (X).

10. A lighting control system according to claim 1, wherein the input device is a touchpad or a control member covered with a touch sensitive surface and wherein the selected lighting configurations are stored in the memory, each selected lighting configuration being associated with a rank and, when the controller detects a finger motion on the touchpad or on the touch sensitive surface of the control member in one direction, it is configured to increment the active lighting configuration rank by at least one rank to define a new active lighting configuration rank and to control the implementation of at least one new lighting configuration that corresponds to the new active lighting configuration rank.

11. A lighting control system according to claim 1, wherein the sensor is chosen among the followings:
light or sun sensor,
rain sensor,
fog sensor,
park brake sensor.

12. A lighting control system according to claim 1, wherein the controller is configured to automatically select which lighting configurations can be implemented and to automatically determine in which order the selected lighting configurations are implemented depending also on vehicle localization data.

13. A lighting control method to implement, in an automotive vehicle, external running lights, in different available lighting configurations, wherein the automotive vehicle comprises:
a controller to control and implement lighting configurations,
an input device that can be manually actuated,
at least one sensor connected to the controller and able to detect at least one environment parameter,
wherein the lighting control method comprises the steps of:
a) detecting at least one environment parameter,
b) selecting among the different available lighting configurations and depending on the parameter, which lighting configurations can be implemented,
c) depending on the parameter, defining in which order the selected lighting configurations are implemented when the input device is manually actuated,
d) detecting a manual actuation on the input device,
e) depending on a motion of the input device or a motion on the input device, implementing at least one lighting configuration that is chosen among the selected lighting configurations according to the implementation order.

14. A lighting control method according to claim 13, wherein the input device is a manually operable control member movable in at least one direction.

15. A lighting control method according to claim 14, wherein the method comprises the steps of:
detecting at least one environment parameter,
selecting among the different available lighting configurations and depending on the parameter, which lighting configurations can be implemented,
depending on the parameter, assigning to each selected lighting configuration a lighting configuration rank to define in which order the selected lighting configurations are implemented when the control member is manually operated,
detecting a manual actuation on the control member,
depending on the motion of the control member, incrementing or decrementing an active lighting configuration rank by at least one rank in order to define a new active lighting configuration rank,
among the selected lighting configurations, implementing the at least one lighting configuration that has a rank which corresponds to the new active lighting configuration rank.

16. A method according to claim 15, wherein:
the control member is movable bidirectionally, and
the motion of the control member in one direction allows the incrementation of the lighting configuration rank and the motion of the control member in the opposite direction allows the decrementation of the lighting configuration rank.

17. A method according to claim 13, wherein the method further comprises the following steps:
detecting a modification of the environment parameter,
determining if the modification of the environment parameter requests the selection of new lighting configurations among the different available lighting configurations,
selecting new lighting configurations among the different available lighting configurations and defining in which order the new selected lighting configurations are implemented.

18. A method according to claim 13, wherein
the controller is able to activate an automatic mode where some selected lighting configurations can be automatically implemented, and wherein the method further comprises the following steps:
determining among the selected lighting configurations which lighting configurations are authorized to be automatically modified by the controller and which lighting configurations are authorized to be automatically implemented by the controller,
determining if the controller is authorized to automatically modify the current lighting configuration, depending on at least one environment parameter, determining, among the lighting configurations authorized for automatic implementation, the at least one that is suitable, without a manual actuation on the input device, automatically implementing the at least one lighting configuration that is suitable and authorized for automatic implementation.

19. A method according to claim 18, wherein the lighting configurations that the controller is authorized to automatically modify and/or implement are different from one selection of lighting configurations to another selection.

20. A method according to claim 13, wherein the input device is a touchpad or a control member covered with a touch sensitive surface and wherein the method comprises the steps of:

detecting at least one environment parameter, selecting among the different available lighting configurations and depending on the parameter, which lighting configurations can be implemented, depending on the parameter, assigning to each selected lighting configuration a lighting configuration rank to define in which order the selected lighting configurations are implemented when the touchpad or the touch sensitive surface of the control member receives a manual actuation, detecting a manual actuation on the touchpad or on the touch sensitive surface of the control member, depending on a motion on the touchpad or on the touch sensitive surface of the control member, incrementing or decrementing an active lighting configuration rank by at least one rank in order to define a new active lighting configuration rank, among the selected lighting configurations; implementing the at least one lighting configuration that has a rank which corresponds to the new active lighting configuration rank.

21. A method according to claim 13, wherein the different steps are performed in an automatic manner by the lighting control system according to claim 1.

* * * * *